ELECTRICAL SIGNALLING SYSTEMS

Filed Feb. 23, 1962 5 Sheets-Sheet 1

INVENTOR
RONALD IAN HART
BY
DEZSOE STEINHERZ
ATTORNEY

INVENTOR
RONALD IAN HART
BY
DEZSOE STEINHERZ
ATTORNEY

INVENTOR
RONALD IAN HART
BY
DEZSOE STEINHERZ
ATTORNEY

INVENTOR
RONALD IAN HART
BY
DEZSOE STEINHERZ
ATTORNEY

INVENTOR
RONALD IAN HART
BY
DEZSOE STEINHERZ
ATTORNEY 3,227,810

ELECTRICAL SIGNALLING SYSTEMS

Ronald Ian Hart, Taplow, England, assignor to British Telecommunications Research Limited, Taplow, England, a British company Filed Feb. 23, 1962, Ser. No. 175,170
Claims priority, application Great Britain, Feb. 23, 1961, 6,707/61
8 Claims. (Cl. 179—15)

The present invention relates to electrical signalling systems and is more particularly concerned with pulse communication systems operating on a time division multiplex basis, for instance of the type known as pulse code modulation. For satisfactory operation of such systems, it is found necessary in practice to employ one of the channels for synchronisation purposes and this operates in conjunction with the frequency control or so-called clock system.

In any large scale application of such pulse systems, the need will certainly arise for interconnecting different systems which accordingly have their own individual clock control. Though the accuracy and stability of the timing may be quite high, it is inevitable that long-term drift will occur and this will clearly produce difficulties when the systems are interconnected since the various clock systems must necessarily be independent.

One possible method of overcoming the difficulty would be to demodulate the channels of each system, interconnect the channels at audio frequency and then re-code the channels on to the new multiplex system. This involves a good deal of additional equipment and also is objectionable from the technical point of view in that it adds to the quantising noise, and hence it is generally preferable to interconnect the pulse systems directly without demodulation.

It is also likely to occur in practice that channels in a certain time position in one system will need to be connected to channels in a different time position in another system and this makes the use of some form of storage essential. Since, as has already been stated, it is impracticable to maintain two systems in exact synchronism over a long period, it will follow that in course of time one system will gain on the other and this will mean that the interval between the instant at which the information is fed into the store and the instant at which it is extracted for re-transmission will gradually decrease to zero and it is clear that as long as the two systems are practically in phase, there is a danger of information being lost. The present invention is concerned with overcoming the difficulties of asynchronous clocks in conjunction with a plurality of systems any one of which may be connected to any other one.

According to the invention, use is made of two sets of stores which are normally used alternately and arrangements are provided whereby when there is danger of two interconnected systems becoming in-phase as regards the two channels which are connected, the changeover operation from one store to the other is inhibited for sufficiently long to secure that the in-phase condition will be passed.

Figure 1:
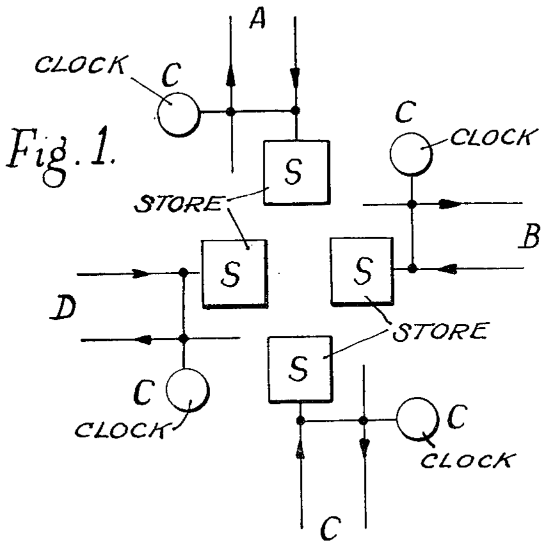
Figure 2:
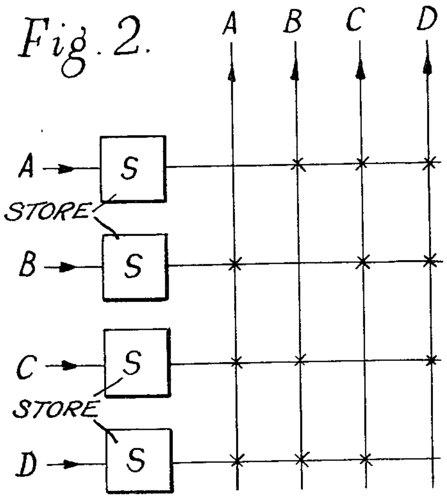
Figure 3:
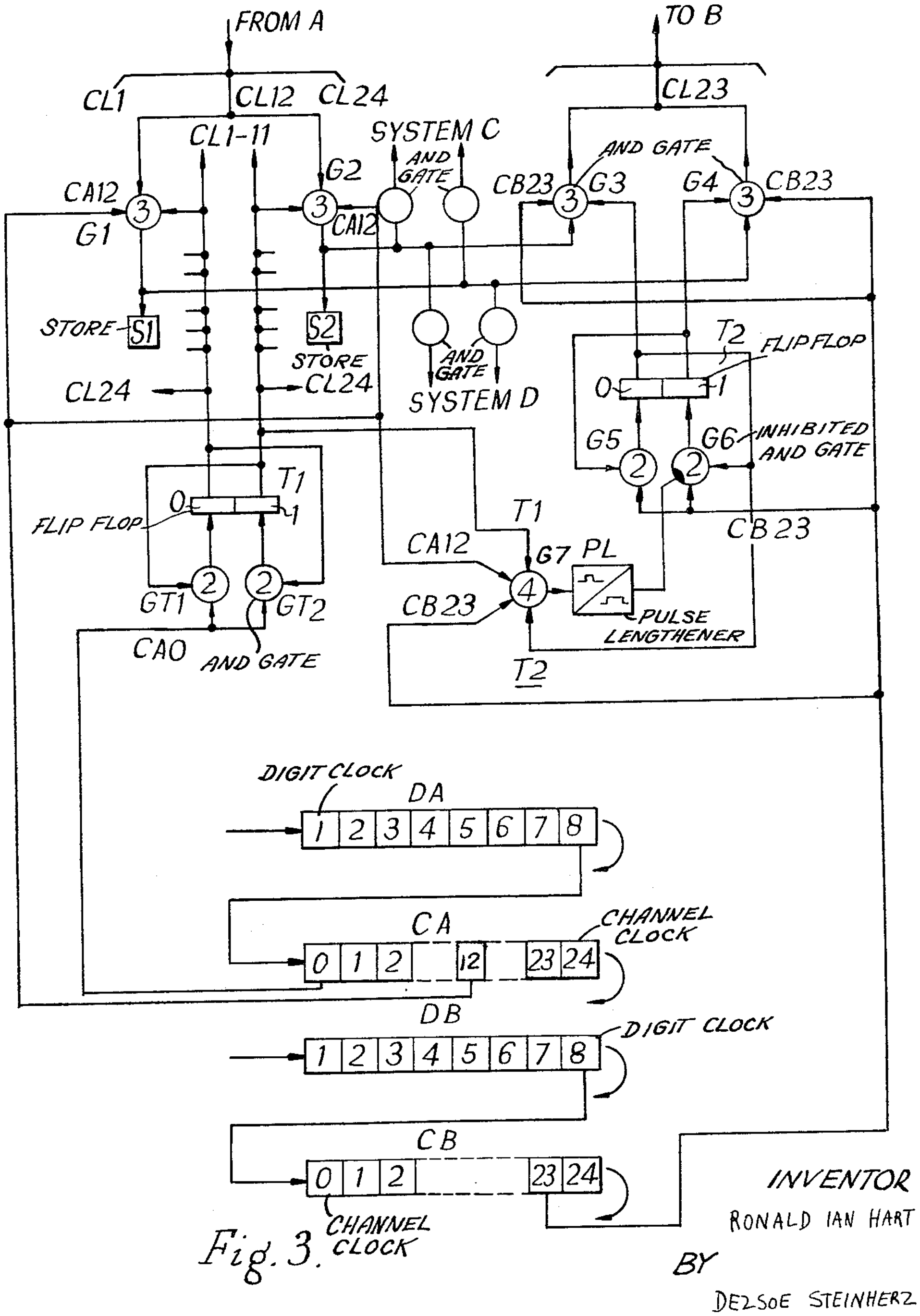
Figure 4:
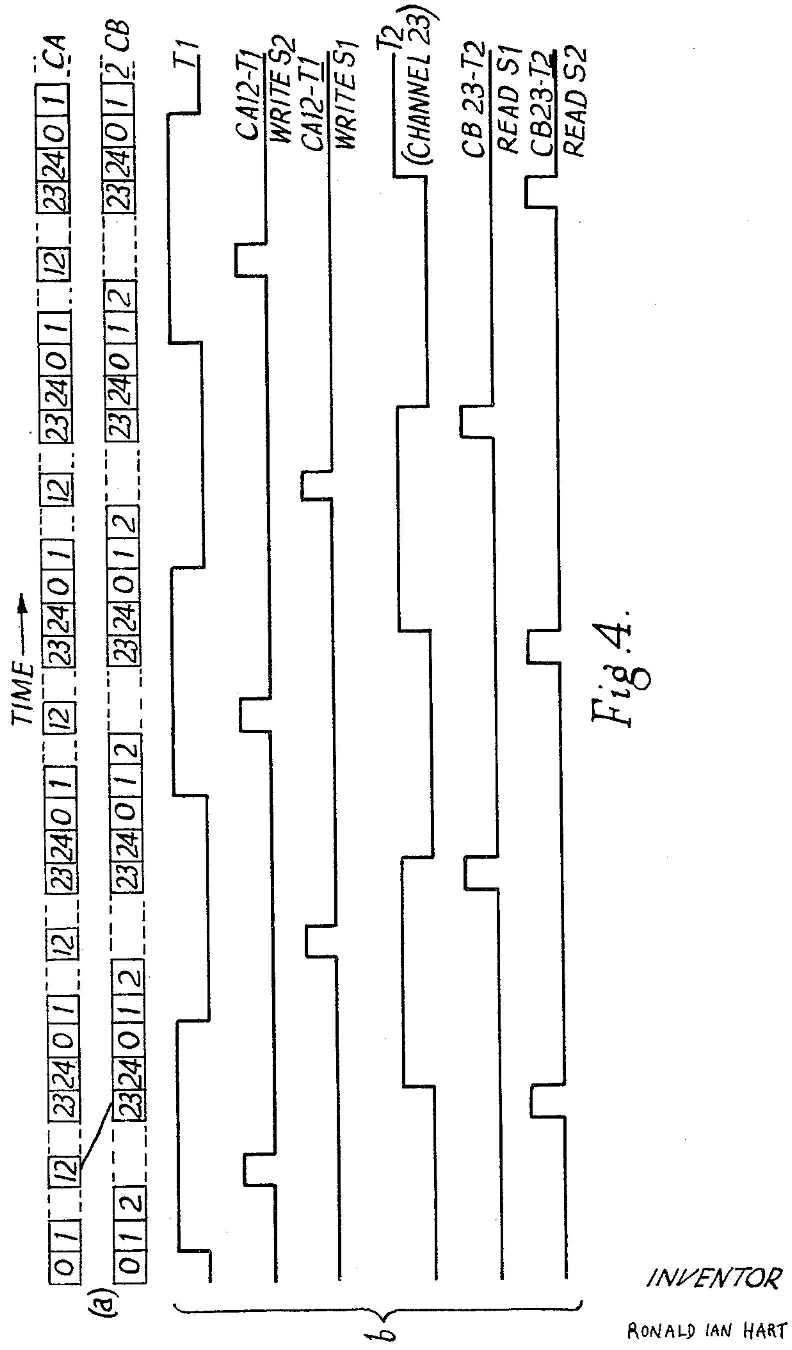
Figure 5:
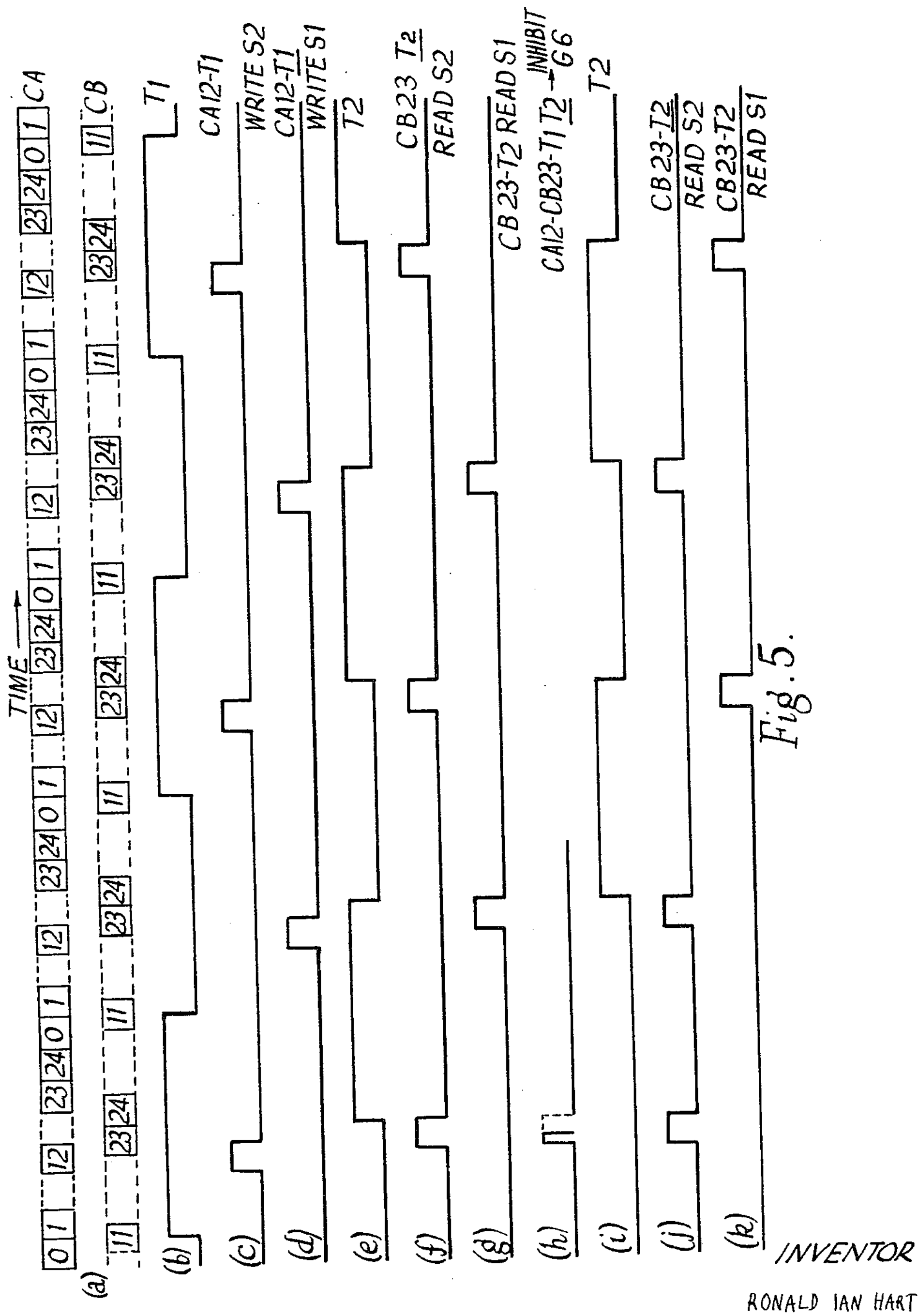
Figure 6:
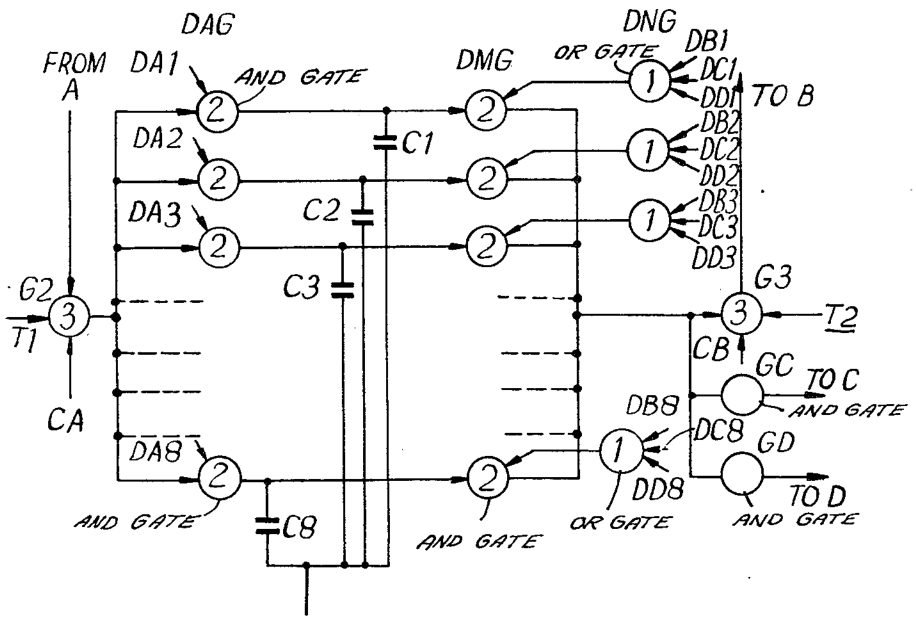

The invention will be better understood from the following description of one method of carrying it into effect which should be taken in conjunction with the accompanying drawings comprising FIGURES 1–6. FIGURE 1 shows diagrammatically the use of four both-way systems A, B, C, D each with its own store S and controlling clock C associated with the incoming side. It is assumed for convenience that the same clock will serve to control the outgoing connection though this is not essential. FIGURE 2 shows diagrammatically the manner in which any system may be connected with any other system as indicated by the crosses. This figure does not include the clocks but shows the store S which is associated with the incoming side of each system. FIGURE 3 shows diagrammatically the general method of operation and illustrates particularly the interconnection between a channel of system A and a channel of system B. FIGURE 4 shows a number of waveforms from which the general method of operation will be more readily understood and FIGURE 5 shows somewhat similar waveforms which are extended to make clear how the inhibition of the transfer from one store to the other is brought about. FIGURE 6 shows details of one of the channel stores assumed to be associated with system A.

It will be assumed that each of the systems caters for 25 channels, of which one is the synchronising channel and that each channel period comprises 8 digits or bits so that a full cycle or frame corresponds to 200 bits. Moreover if the sampling speed is 8,000 c./s., which is a very usual figure in practice, particularly if the information is speech, the bit frequency will be 1.6 mc./s. and each frame will last for 125 $\mu$'s.

Referring now particularly to FIGURE 3, it will be understood that the A system is controlled by a digit clock giving the pulses DA1–DA8 and a channel clock operated therefrom giving pulses CA0–CA24, of which CA0 is associated with the synchronising channel. These are shown conventionally as comprising ring counters driven by pulses at the bit frequency but any suitable source of clock pulses may be employed. It is assumed moreover that arrangements of generally known type are provided for interconnecting channel 12 of system A with channel 23 of system B. Arrangements for effecting this, which comprise in essence suitable choice of the connections to the gates, are known in the art and form no part of the present invention. It will be appreciated that means may be provided for varying the channels which are interconnected so as to permit selective connection to be made, for instance under the control of a dial at a telephone subscriber's instrument. The system A store is duplicated to form the two parts S1 and S2 which are used alternately for different frames as determined by the toggle or flip-flop T1 which is changed over regularly after each frame by way of the gates GT1 and GT2 under the control of the synchronising channel pulse CA0. Assuming that the toggle T1 is not operated so that the store S1 is being used for reception, during the channel pulse CA12 gate G1 is opened and hence information from the A system over channel 12 lead CL12 is transmitted to store S1. This store is read during the channel pulse CB23 if the toggle T2 associated with this channel is in its set position so as to open the gate G4. Toggle T2, it will be appreciated, is set by channel pulse CB23 which is effective to open gate G6. Similarly for the succeeding frame, channel 12 information from system A is routed to the store S2 from which it is subsequently extracted for transmission over the B system by way of the gate G3 on the assumption that the toggle T2 will have been reset by this time over gate G5, which will be the case provided the two interconnected channels of the two systems are not near the in-phase condition.

It will be noted that while the toggle T1 serves all the channels of system A and does not need to have its operations modified, toggle T2 is individual to the particular B system channel concerned and does not always change over regularly for each frame. Obviously other toggles such as T2 will be provided associated respectively with the remaining B system channels.

FIGURE 6 shows a possible form of the store S2 and the various other stores will be similar. In this case use is made of capacitors C1, C2, C3 . . . C8 for storage purposes and these are connected up in turn for the 8 bits concerned under the control of the gates DAG controlled respectively by the digit clock pulses DA1–DA8. The extraction of information from the store is controlled by the corresponding pulses of the other system, the possibility being provided as already pointed out of connecting system A to any one of systems B, C and D. Accordingly the AND gates DMG are controlled from the OR gates DNG which have inputs from each of the other three systems in the form of digit clock pulses DB1, DC1, DD1 . . . The output from the store is extended to system B over gate G3 also shown in FIG. 3 or over gate GC to system C or gate GD to system D. This arrangement obviously permits some channels of system A to be connected to system B, others to system C and the remainder to system D if this is in accordance with operating requirements.

The operation will be more readily appreciated from reference to the waveforms of FIGURE 4. The upper two lines (a) show a number of successive frames of the A and B systems and it is indicated that channel CA12 is to be connected with channel CB23. Of the waveforms indicated as (b), the uppermost represents the state of the toggle T1 and the succeeding one represents the channel clock pulse CA12 during the time that T1 is operated, i.e., the coincidence CA12.T1, which produces storage in the store S2. Similarly the next waveform represents storage in the store S1 during the time that toggle T1 is reset, thus corresponding to the coincidence CA12.$\overline{T1}$. The next three waveforms relate to the B system and show respectively the position of the toggle T2, the coincidence of the channel clock pulse CB23 with the set condition of toggle T2 and the coincidence of this pulse with the reset condition of toggle T2. The first coincidence, i.e., CB23.T2, corresponds to extracting information from store S1 and the second, i.e., CB23.$\overline{T2}$, corresponds to extraction of information from store S2 for transmission over channel 23 of the B system.

FIGURE 5 shows somewhat similar waveforms at a time when the B system has gained on the A system so that the channel pulses are very nearly in phase. Again (a) represents the channel pulses for the two systems, while (b) represents the state of toggle T1 and (c) is the coincidence of CA12 and T1 which causes storage to take place in the store S2. (d) represents storage in the store S1 corresponding to the coincidence of CA2 with the reset condition of toggle T1. The waveform (e) represents as in FIGURE 4 the state of toggle T2 during straightforward operation, while (f) is the waveform controlling the extraction of information from store S2 and (g) is the similar waveform for the extraction of information from the store S1. All these waveforms are the same as those shown in FIGURE 4 except for the different phase displacement of the two systems.

With the conditions shown in FIGURE 5 in which the channel pulse CA12 overlaps the channel pulse CB23, a pulse is produced in accordance with the waveform (h) which represents the coincidence CA12, CB23, T1, T2. From reference to FIGURE 3 it will be seen that this coincidence produces a pulse by way of gate G7 which is conveniently passed to the pulse lengthener PL and then serves to inhibit gate G6. As a consequence, toggle T2 is not changed over as is normally done by the pulse CB23 but remains reset until the next channel pulse CB23 so that its waveform is now represented by (i) rather than (e). As a consequence, reading of the store S1 does not take place but two successive reading operations are made of the store S2 as indicated by the waveform (j) and reading of S1 is resumed at a time corresponding to the previous reading of S2. In other words, a slip of one frame has been produced and though this means that one frame has not been transmitted, the difficulties arising from the occurrence of the in-phase condition have been surmounted with the loss of only one frame. This is readily tolerable provided the systems are sufficiently near sychronism that it does not occur very often, for instance at intervals of the order of 1 minute. By contrast, if no steps were taken to deal specially with the in-phase condition, several thousand successive frames might have been mutilated.

The invention accordingly provides a means of mutual inter-communication between a plurality of multiplex systems which overcomes in a simple manner the danger of intolerable loss of information at intervals due to unavoidable differences in the basic frequencies of the different systems.

I claim:

1. In a time division multiplex pulse communication arrangement, a first system over which signals are transmitted to a receiving point, a first frequency control arrangement for controlling the multiplexing operation of said first system, a second system over which said signals are transmitted from said receiving point, a second frequency control arrangement for controlling the multiplexing operation of said second system, the frequencies of said first and second frequency control arrangements being nominally the same but mutually independent, first and second means at said receiving point for storing signals incoming over said first system, means for retransmitting said stored signals over said second system, switching means for causing said first and second storage means to be used alternately for storage and subsequent retransmission of signal groups of predetermined size incoming over said first system, and control arrangements for modifying the normal changeover operation of said switching means, said control arrangements becoming effective when owing to progressive slight changes in the frequencies defined by at least one of said first and second frequency control arrangements, the time relationship between the storage and retransmitting operations in respect of said first and second storage means is such that the time between completion of storage and commencement of retransmission approaches zero and also when the said time relationship is such that the time between completion of retransmission and commencement of storage approaches zero, whereby the prospective interfering phase relationship between said first and second frequency control arrangements is avoided.

2. In a time division multiplex pulse communication arrangement, a first system over which signals are transmitted to a receiving point, a first frequency control arrangement for controlling the multiplexing operation of said first system, a second system over which said signals are transmitted from said receiving point, a second frequency control arrangement for controlling the multiplexing operation of said second system, the frequencies of said first and second frequency control arrangements being nominally the same but mutually independent, first and second means at said receiving point for storing signals incoming over said first system, means for retransmitting said stored signals over said second system, switching means for causing said first and second storage means to be used alternately for storage and subsequent retransmission of signal groups of predetermined size incoming over said first system, and control arrangements for modifying the operation of said switching means by inhibiting the changeover from one of said first and second storage means to the other, said control arrangements becoming effective when owing to progressive slight changes in the frequencies defined by at least one of said first and second frequency control arrangements, the time relationship between the storage and retransmitting operations in respect of said first and second storage means is such that the time between completion of storage and commencement of retransmission approaches zero and also when the said time relationship is such that the time between completion of retransmission and commencement of storage approaches zero, whereby the prospective interfering phase relationship between said first and second frequency control arrangements is avoided.

3. In a time division multiplex pulse communication arrangement, a first system over which signals are transmitted to a receiving point, a first frequency control arrangement for controlling the multiplexing operation of said first system, a second system over which said signals are transmitted from said receiving point, a second frequency control arrangement for controlling the multiplexing operation of said second system, the frequencies of said first and second frequency control arrangements being nominally the same but mutually independent, first and second means at said receiving point for storing signals incoming over said first system, means for retransmitting said stored signals over said second system, switching means for causing said first and second storage means to be used alternately for storage and subsequent retransmission of signal groups of predetermined size incoming over said first system, and control arrangements for modifying the operation of said switching means by delaying for a predetermined time the changeover from one of said first and second storage means to the other, said control arrangements becoming effective when owing to progressive slight changes in the frequencies defined by at least one of said first and second frequency control arrangements, the time relationship between the storage and retransmitting operations in respect of said first and second storage means is such that the time between completion of storage and commencement of retransmission approaches zero and also when the time relationship is such that the time between completion of retransmission and commencement of storage approaches zero, whereby the prospective interfering phase relationship between said first and second frequency control arrangements is avoided.

4. In a time division multiplex pulse communication arrangement, a first system over which signals are transmitted to a receiving point, a first frequency control arrangement for controlling the multiplexing operation of said first system, a second system over which said signals are transmitted from said receiving point, a second frequency control arrangement for controlling the multiplexing operation of said second system, the frequencies of said first and second frequency control arrangements being nominally the same but mutually independent, first and second means at said receiving point for storing signals incoming over said first system, first switching means at said receiving point for causing said first and second storage means to be used alternately for the storage of signal groups of predetermined size incoming over said first system, second switching means for controlling retransmission of said stored signals over said second system alternately from said first and second storage means, and control arrangements for inhibiting the operation of said second switching means, said control arrangements becoming effective when owing to progressive slight changes in the frequencies defined by at least one of said first and second frequency control arrangements, the time between the respective operations of said first and second switching means approaches zero, whereby the prospective interfering phase relationship between said first and second frequency control arrangements is avoided.

5. In a time division multiplex pulse communication arrangement, a first system over which signals are transmitted to a receiving point, a first frequency control arrangement for controlling the multiplexing operation of said first system, a second system over which said signals are transmitted from said receiving point, a second frequency control arrangement for controlling the multiplexing operation of said second system, the frequencies of said first and second frequency control arrangements being nominally the same but mutually independent, first and second means at said receiving point for storing signals incoming over said first system, first switching means at said receiving point for causing said first and second storage means to be used alternately for the storage of signal groups of predetermined size incoming over said first system, second switching means for controlling retransmission of said stored signals over said second system alternately from said first and second storage means and control arrangements for inhibiting one of the operations of said second switching means, said control arrangements becoming effective when owing to progressive slight changes in the frequencies defined by at least one of said first and second frequency control arrangements, the time between the respective operations of said first and second switching means approaches zero, whereby the prospective interfering phase relationship between said first and second frequency control arrangements is avoided.

6. In a time division multiplex pulse communications arrangement, a first system over which signals are transmitted to a receiving point, a first frequency control arrangement for controlling the multiplexing operation of said first system, a second system over which said signals are transmitted from said receiving point, a second frequency control arrangement for controlling the multiplexing operation of said second system, the frequencies of said first and second frequency control arrangements being nominally the same but mutually independent, first and second means at said receiving point for storing signals incoming over said first system, first switching means at said receiving point for causing said first and second storage means to be used alternately for the storage of signal groups of predetermined size incoming over said first system, second switching means for controlling retransmission of said stored signals over said second system alternately from said first and second storage means, and control arrangements for inhibiting the operation of said second switching means, for a predetermined time, said control arrangements becoming effective when owing to progressive slight changes in the frequencies defined by at least one of said first and second frequency control arrangements, the time between the respective operations of said first and second switching means approaches zero, whereby the prospective interfering phase relationship between said first and second frequency control arrangements is avoided.

7. A time division multiplex pulse communication arrangement as claimed in claim 4 in which said first and second systems serve for the transmission of pulse code modulation signals, each complete frame including a plurality of signalling channels and a synchronizing channel.

8. An arrangement as claimed in claim 7 in which the control arrangements are dependent on said first and second switching means and also on pulses defining the channels to be connected in said first and second systems.

References Cited by the Examiner

UNITED STATES PATENTS

| | | | |
|---|---|---|---|
| 2,910,541 | 10/1959 | Harris | 179—15 |
| 2,917,583 | 12/1959 | Burton et al. | 179—15 |

OTHER REFERENCES

Webster's New Collegiate Dictionary, copyright 1961, G. and C. Merriam Company.

DAVID G. REDINBAUGH, *Primary Examiner.*

T. G. KEOUGH, J. McHUGH, *Assistant Examiners.*